United States Patent [19]

Margaritis et al.

[11] Patent Number: 5,729,429
[45] Date of Patent: Mar. 17, 1998

[54] ERGONOMIC LAPTOP COMPUTER HAVING DISPLAY POSITIONING SUPPORTS

[76] Inventors: Georgios Margaritis, 620 Iris Ave., Apt #205, Sunnyvale, Calif. 94086; Mark V. Brillhart, 1891 Kobuk Valley Common, San Jose, Calif. 95131

[21] Appl. No.: 603,726

[22] Filed: Feb. 20, 1996

[51] Int. Cl.$^6$ .................................. G06F 1/16; H05K 7/14
[52] U.S. Cl. .................................... 361/680; 249/919
[58] Field of Search .............................. 361/680–683; 364/708.1; 248/917–920, 923; G06F 1/16

[56] References Cited

U.S. PATENT DOCUMENTS

| | | | |
|---|---|---|---|
| 5,041,965 | 8/1991 | Chen . | |
| 5,083,290 | 1/1992 | Hosoi | 361/681 |
| 5,196,993 | 3/1993 | Herron et al. | 361/681 |
| 5,218,389 | 6/1993 | Harlon et al. | 353/122 |
| 5,229,920 | 7/1993 | Spaniol et al. | 361/681 |
| 5,245,558 | 9/1993 | Hachey | 364/708.1 |
| 5,249,103 | 9/1993 | Forsythe | 361/730 |
| 5,262,759 | 11/1993 | Moriconi et al. | 361/681 |
| 5,375,076 | 12/1994 | Goodrich et al. | 364/708.1 |
| 5,381,043 | 1/1995 | Kohiyama et al. | 361/681 |
| 5,537,290 | 7/1996 | Brown et al. | 361/681 |

*Primary Examiner*—Lynn D. Feild

[57] ABSTRACT

A portable computer comprising a main computer body with an embedded keyboard, and a display unit. The computer body is electrically connected with the display unit and the display includes a controllably collapsible and erectable display unit support for adjusting the position of the display unit with respect to the main computer body, whereby the display unit can be positioned at a comfortable and ergonomically safe position and the portable computer including the support can be folded compactly for storage or transportation. In another embodiment, the display unit is detachable from the main computer body, and is suspended by an external structurally stable object by suspension, whereby the display unit can be positioned at a comfortable and ergonomically safe position and no support needs to be transported or stored with the computer, thereby saving weight and space.

7 Claims, 6 Drawing Sheets

5,729,429

ERGONOMIC LAPTOP COMPUTER HAVING DISPLAY POSITIONING SUPPORTS

REFERENCES CITED

U.S. PATENT DOCUMENTS

U.S. Pat. No. 5,041,965 August 1991 Chen

BACKGROUND OF THE INVENTION

This invention relates to laptop computers, specifically to an ergonomically designed laptop computer. Laptop computers were introduced to accommodate the mobile computing needs of people whose work environment is not fixed. Laptop computers (also called portable personal computers) are light and compact so that they can be easily transported from location to location.

FIG. 1. shows a perspective view of a prior art laptop computer. The laptop computer has a main computer body 1, a keyboard unit 2 which is electrically and mechanically connected to said main computer body, and a display unit 3 which is permanently attached to the main computer body 1 by some type of hinge mechanism 4. The display unit 3 can be rotated about said hinge mechanism 4. When the laptop computer is transported or stored, the display unit 3 is folded over the main computer body 1. When in use, the display unit is unfolded, as shown in FIG. 1. A laptop computer with detachable display for overhead projector (U.S. Pat No. 5,041,965) also exists to accommodate some needs of presentations in front of audiences.

Modern ergonomics theory and experience teaches us that improper posture of human bodies during the use of computers can produce many types of injuries. These are classified as repetitive strain injuries. FIG. 2 illustrates the proper posture (according to modern ergonomics) necessary to minimize the occurrence of repetitive strain injuries due to computer use. The keyboard unit 10 should be approximately at elbow level while the arms are parallel to the body, and the top of the display unit 11 should be approximately at eye level, or at most 15 degrees below.

Prior art laptop computers are not ergonomic. If the display unit is properly positioned, the keyboard unit will be well above elbow level. If the keyboard is properly positioned, the display unit will be unacceptably below eye level. It is important to note that the laptop computer with a detachable display for an overhead projector (U.S. Pat. No. 5,041,965) is not designed for and cannot address the requirements of an ergonomic laptop computer. The present invention provides a solution to this problem.

BRIEF SUMMARY OF THE INVENTION

The objective of the present invention is to provide an ergonomic laptop computer. Accordingly the preferred embodiment consists of a main computer body, a keyboard unit a detachable display unit, a means for electrically connecting the display unit to the main computer body and a system that supports and allows for adjustment of the position of the display unit. A second embodiment allows for the detachable display unit to be attached to any object.

DETAILED DESCRIPTION

Figure 1:
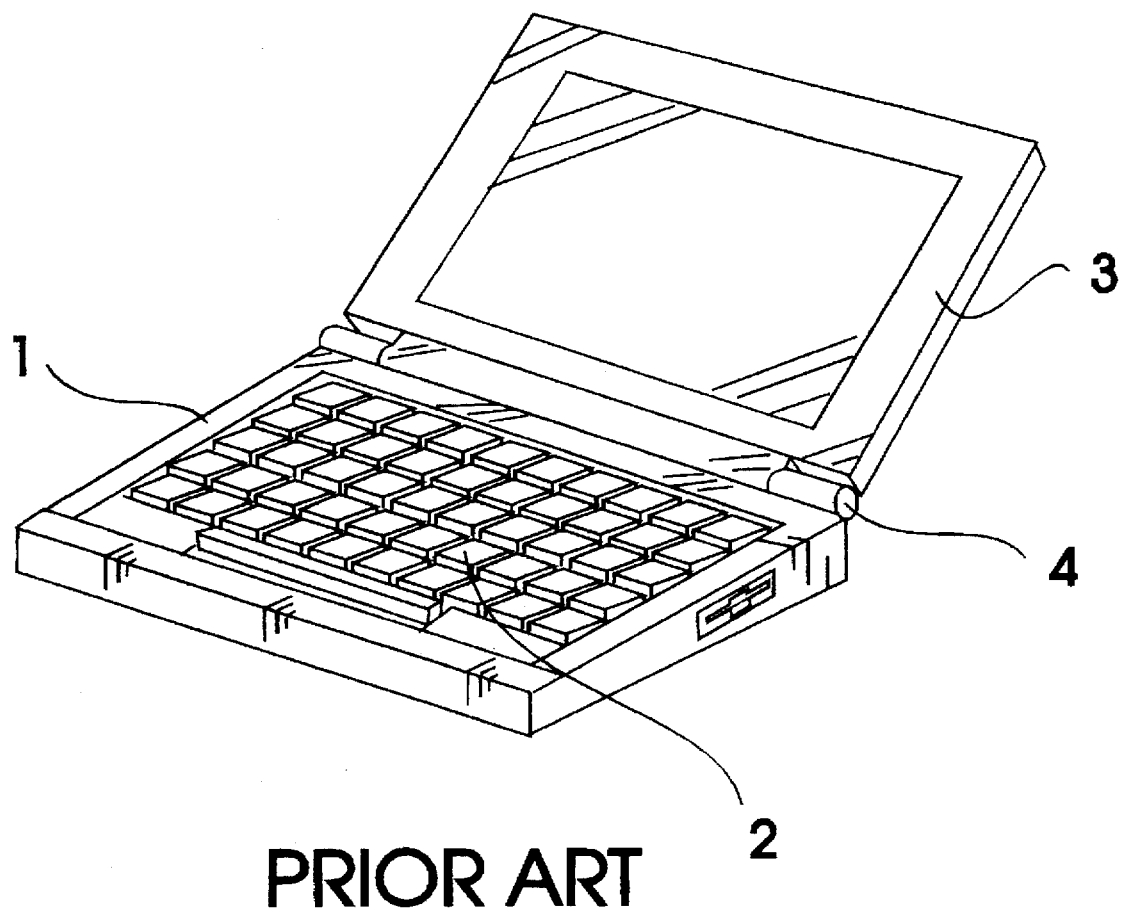
FIG. 1 is a perspective view of a typical laptop computer.
Figure 2:
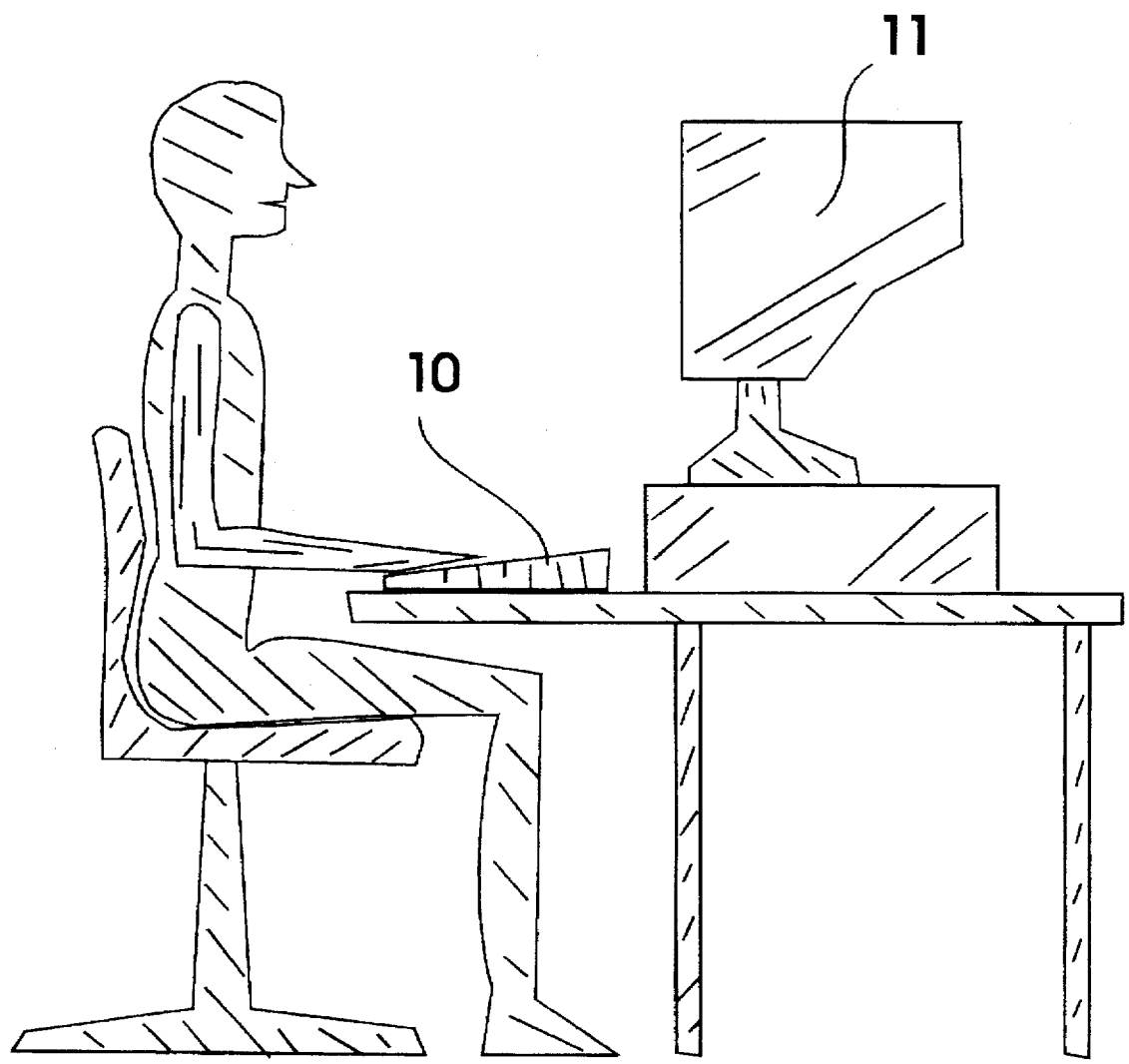
FIG. 2 is a side view of correct ergonomic keyboarding position.
Figure 3:
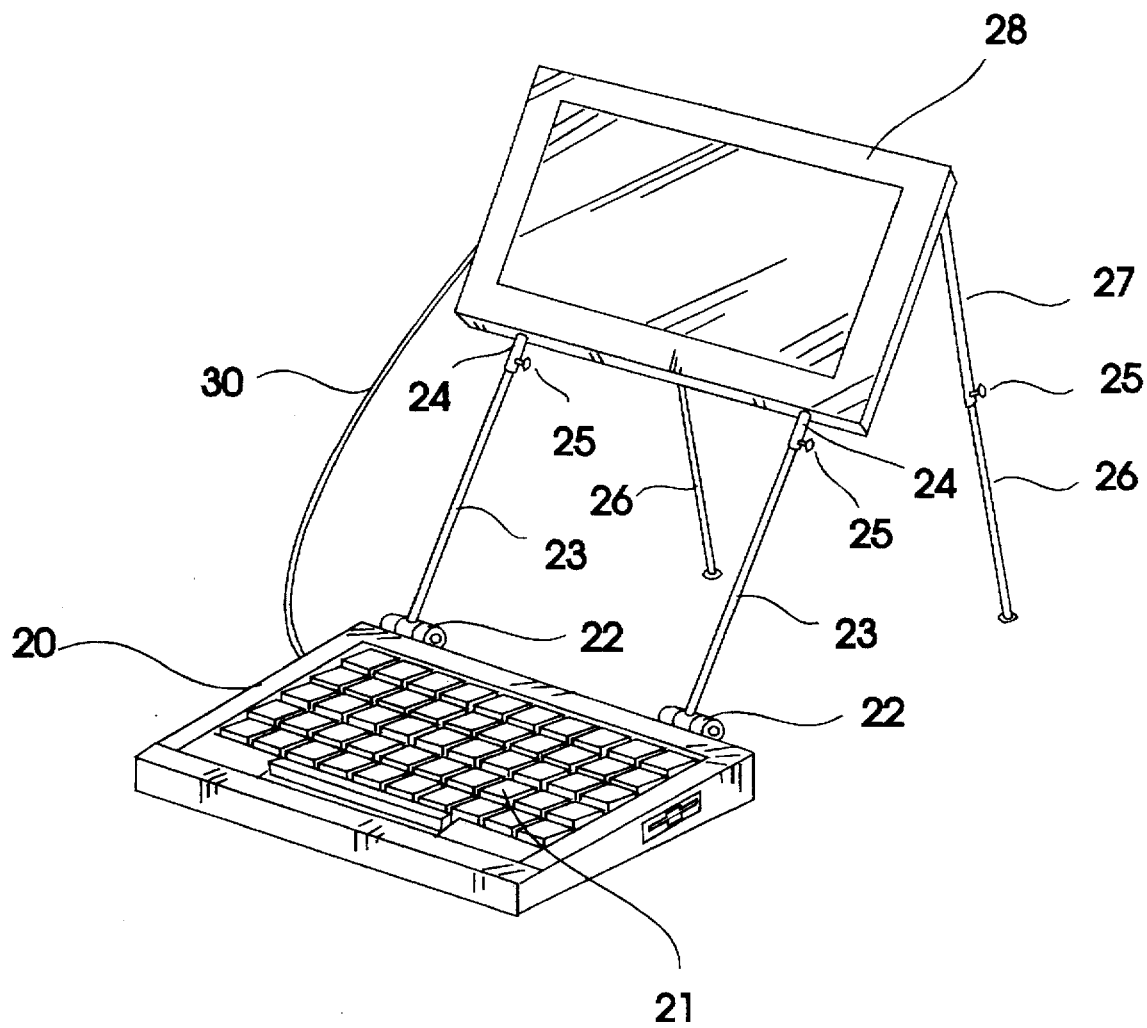
FIG. 3 is a perspective view of one embodiment of this invention.
Figure 4:
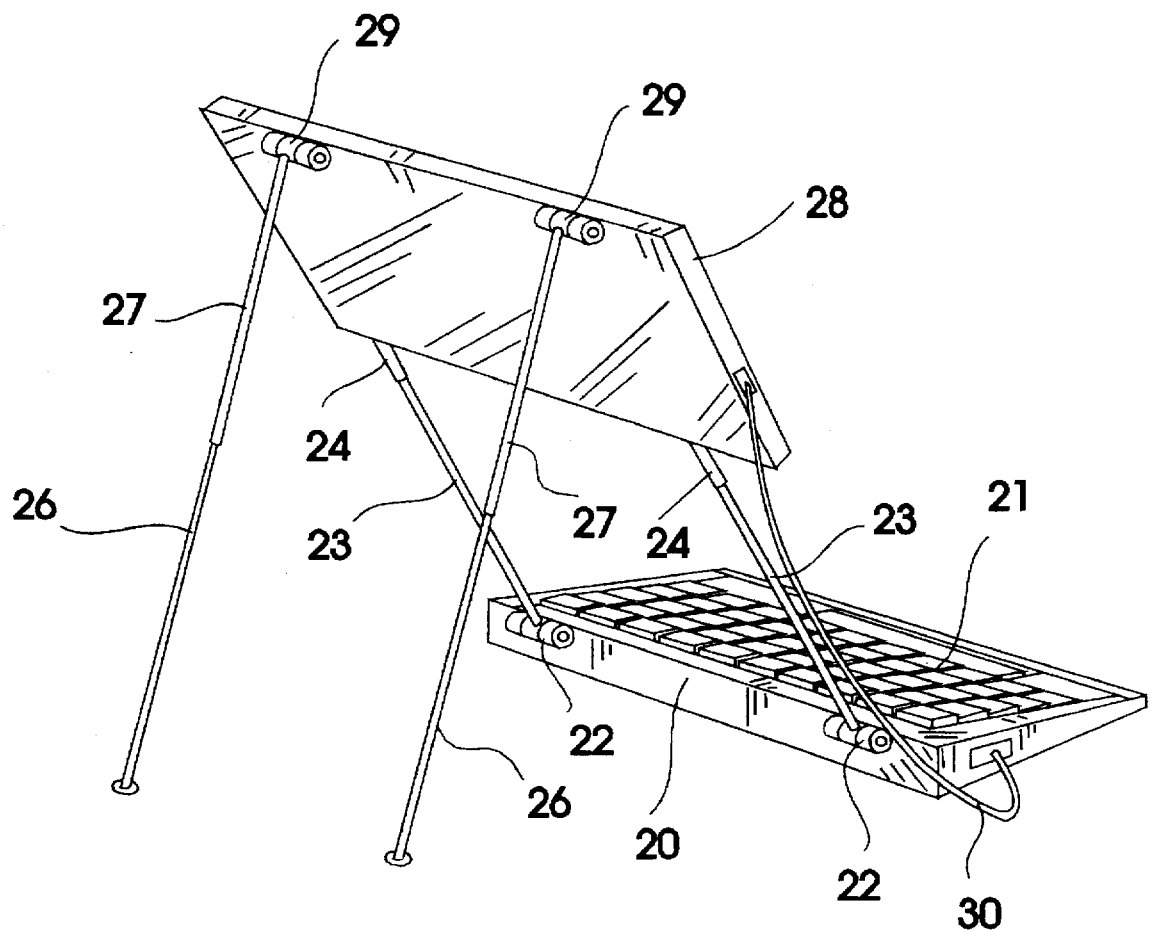
FIG. 4 is a backside view of FIG. 3.

FIGS. 3 and 4 illustrate one embodiment of the present invention. A supportive rod 23 is connected at one end with a hinge 22 to the main computer body 20. The other end of said supportive rod 23 is inserted into a tube 24. The tube 24 is attached to the display unit 28. A thumb-screw 25 is used to lock rod 23 in place. The thumbscrew 25 can be loosened to allow the rod 23 to slide in the tube 24 allowing for the position of the display unit 28 to be adjusted. A flexible cable 30 is used to electrically connect the display unit 28 to the main computer body 20 and keyboard unit 21. A rod 26 slides into a tube 27. A thumbscrew 25 is used to lock the rod 26 in place. The thumbscrew 25 can be loosened to allow the rod 26 to slide in the tube 27 allowing for the position of the display unit 28 to be adjusted. The other end of tube 27 is attached to a hinge 29 that is fixed to the display unit 28.

Figure 5:
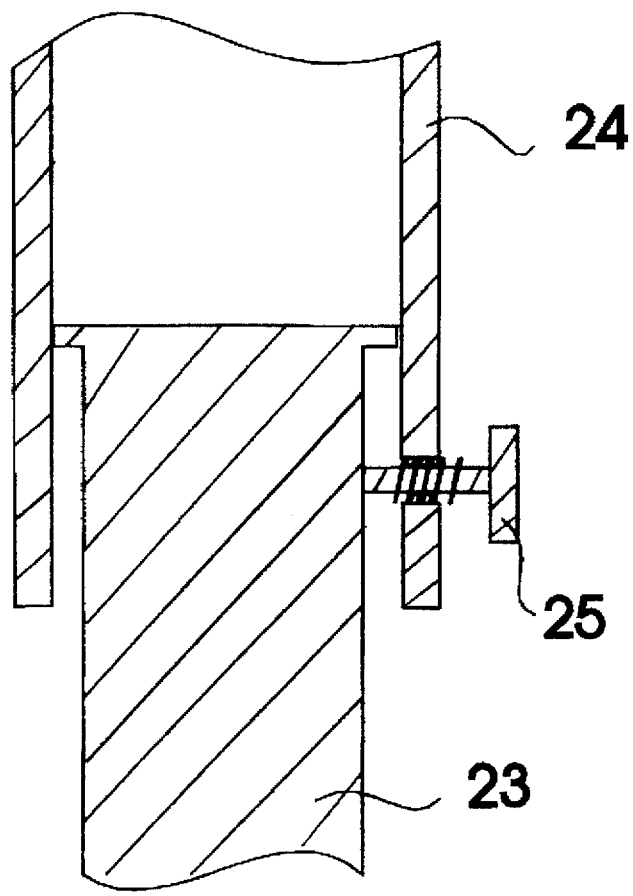
FIG. 5 shows a cross section of the thumbscrew locking mechanism incorporated in FIG.3.

FIG. 5 illustrates the locking mechanisms provided by the thumbscrew 25.

Figure 6:
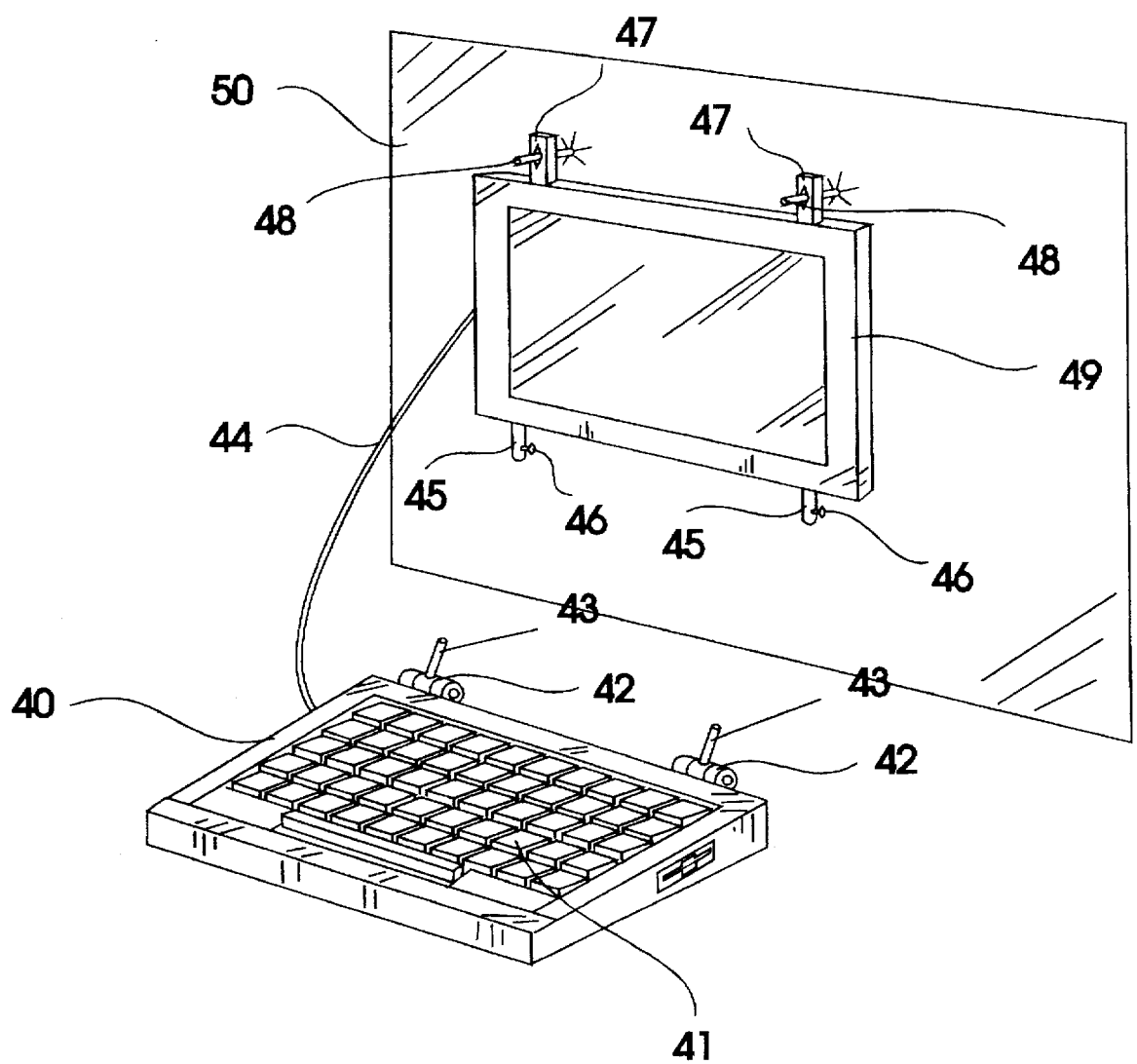
FIG. 6 is a perspective view of another embodiment of this invention.

FIG. 6 illustrates another embodiment of the present invention. A rod 43 is attached at one end to a hinge 42 which is attached to the main computer body 40. The other end of the rod 43 is inserted into a hollow tube 45. The other end of the tube 45 is attached to the display unit 49. A thumbscrew 46 is used to lock the tube 45 to the rod 43. The thumbscrew 46 can be loosened to allow the display unit 49 to be disconnected from the main computer body 40 and the keyboard unit 41. A flexible cable 44 is used to electrically connect the display unit 49 to the main computer body 40 and keyboard 41. An extension 47 with an opening through its body perpendicular to the surface of the display unit 49 is attached to the display unit 49. A pin 48 is anchored to an object 50. The display unit 49 is mounted to the object 50 by placing the extension 47 over the pin 48.

We claim:

1. A portable computer comprising:

(a) a main computer body with embedded keyboard, (b) a display unit, (c) means for connecting electrically said display unit to said main computer body, (d) display position control means that includes a lower point pivotally attached to said main computer body and an upper point attached to said display unit and that can controllably be extended and contracted along the line defined by the lower point and the upper point for structurally connecting said main computer body to said display unit and the independently adjusting the distance and angle of said display unit from and with respect to said main computer body and, (b) display back support means that includes a display attachment point pivotally attached to said display unit and an unconstrained point and that can controllably be extended and contracted along the line defined by the display attachment point and the unconstrained point for providing in combination with said display position control means a structurally stable support base to said display unit and for adjusting the height of said display unit above said main computer body, whereby the display unit can be positioned at a comfortable height, angle and distance above, with respect to and from said main computer body and the portable computer including the support means can be folded compactly for storage or transportation thereby saving weight and space.

2. The portable computer of claim 1 wherein said display unit is detachable.

3. The portable computer of claim 1 wherein said display position control means comprising
   (a) a plurality of members and
   (b) locking means for holding said members in any extended or contracted position and for assembling together and disassembling said members.

4. The portable computer of claim 1 wherein said display position control means comprising:
   (a) at least one frontal telescopic member having a lower point pivotally attached to said main computer body and an upper point attached to said display unit, and that can controllably be extended and contracted along the line defined by the lower point and the upper point and,
   (b) at least one rear telescopic member having a point pivotally attached to said display unit and a second point free, and that can controllably be extended and contracted along the line defined by the two points.

5. The portable computer of claim 3 wherein said frontal telescopic member includes a rod inserted into a hollow tube.

6. The portable computer of claim 5 wherein said hollow tube includes a threaded hole and a thumbscrew that can lock said rod into a fixed position with respect to said hollow tube and that can be loosened and removed to allow for said hollow tube to be completely detached from said rod, whereby the display unit and part of the support means can be detached from the rest of the assembly thereby enhancing versatility.

7. The portable computer of claim 3 wherein said rear telescopic member includes a rod inserted into a tube.

* * * * *